US012360495B2

(12) United States Patent
Kobayashi

(10) Patent No.: US 12,360,495 B2
(45) Date of Patent: Jul. 15, 2025

(54) TIMEPIECE DIAL, TIMEPIECE, AND METHOD FOR MANUFACTURING TIMEPIECE DIAL

(71) Applicant: Seiko Epson Corporation, Tokyo (JP)

(72) Inventor: Shogo Kobayashi, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 493 days.

(21) Appl. No.: 17/720,346

(22) Filed: Apr. 14, 2022

(65) Prior Publication Data

US 2022/0334536 A1 Oct. 20, 2022

(30) Foreign Application Priority Data

Apr. 15, 2021 (JP) ................................ 2021-068906

(51) Int. Cl.
*G04B 19/06* (2006.01)
*G04D 3/00* (2006.01)

(52) U.S. Cl.
CPC .......... *G04B 19/06* (2013.01); *G04D 3/0069* (2013.01)

(58) Field of Classification Search
None
See application file for complete search history.

(56) References Cited

U.S. PATENT DOCUMENTS

| | | | | |
|---|---|---|---|---|
| 2004/0239750 | A1 | 12/2004 | Kneer et al. | |
| 2019/0302697 | A1 | 10/2019 | Larriere et al. | |
| 2020/0086678 | A1 | 3/2020 | Bienvenu et al. | |
| 2020/0292996 | A1 * | 9/2020 | Jeanrenaud .......... | A44C 27/006 |
| 2020/0293001 | A1 | 9/2020 | Jeanrenaud et al. | |

FOREIGN PATENT DOCUMENTS

| | | | |
|---|---|---|---|
| CH | 713871 | A1 | 1/2019 |
| CH | 715925 | A2 | 9/2020 |
| EP | 3709102 | A1 | 9/2020 |
| JP | H05-156425 | A | 6/1993 |
| JP | 2000155181 | A | 6/2000 |
| JP | 2006-214733 | A | 8/2006 |
| JP | 2009-079942 | A | 4/2009 |
| JP | 2020-501148 | A | 1/2020 |
| JP | 2020-076740 | A | 5/2020 |
| JP | 2020-148765 | A | 9/2020 |

* cited by examiner

*Primary Examiner* — Renee S Luebke
*Assistant Examiner* — Matthew Daniel Hwang
(74) *Attorney, Agent, or Firm* — Harness, Dickey & Pierce, P.L.C.

(57) ABSTRACT

A timepiece dial including a base having a first region having a coating film provided at the surface of the base, a second region where laser light is radiated to the first region to remove the coating film, and a third region, in part of the first region, where the coating film is penetrated and the base is dug down, and the surface roughness of the third region is smaller than the surface roughness of the second region.

7 Claims, 8 Drawing Sheets

TIMEPIECE DIAL, TIMEPIECE, AND METHOD FOR MANUFACTURING TIMEPIECE DIAL

The present application is based on, and claims priority from JP Application Serial Number 2021-068906, filed Apr. 15, 2021, the disclosure of which is hereby incorporated by reference herein in its entirety.

BACKGROUND

1. Technical Field

The present disclosure relates to a timepiece dial, a timepiece including the timepiece dial, and a method for manufacturing the timepiece dial.

2. Related Art

It has been proposed that the dial, which is the face of a wristwatch, is devised to enhance the decorativeness and appearance thereof. For example, JP-A-2000-155181 discloses a technique for enhancing the decorativeness of a dial by forming a variety of uneven patterns on the surface of the dial.

According to JP-A-2000-155181, the dial has a configuration in which an adhesive resin layer, a thin metal film, and a transparent plate are laminated on a base substrate, and the adhesive resin layer is so coated with the thin metal film that the thin metal film follows an uneven surface formed at the surface of the adhesive resin layer. The JP-A-2000-155181 describes that a large number of uneven patterns are formed at the uneven surface of the adhesive resin layer by placing a flat plate on the resin layer, evenly pressing the flat plate against the resin layer before the resin layer is cured, and then pulling the flat plate upward to cause the flat plate to pull the surface of the resin layer. The JP-A-2000-155181 further describes that the transparent plate provided on the thin metal film amplifies the three-dimensional effect of the uneven pattern.

The dial described in JP-A-2000-155181, however, has a problem of a difficulty in creating an intended uneven pattern. In detail, in the method of the related art, which depends on the viscosity of the adhesive resin layer, the material of the flat plate, the pulling speed, and other factors, the formed uneven pattern is not regular, and it is difficult to quantitatively control the positions, number, size, shape, and height of the unevenness. In other words, it is required to provide a timepiece dial having high decorativeness and excellent appearance that allow expression of an intended pattern.

SUMMARY

A timepiece dial according to an aspect of the present application includes a base having a first region having a coating film provided at a surface of the base, a second region where laser light is radiated to the first region to remove the coating film, and c, and surface roughness of the third region is smaller than surface roughness of the second region.

A timepiece according to another aspect of the present application includes a timepiece dial described above.

DESCRIPTION OF EXEMPLARY EMBODIMENTS

First Embodiment *Overview of Timepiece*

Figure 1:
FIG. 1 is a plan view of a timepiece according to a first embodiment.

FIG. 1 is a plan view of a timepiece according to the present embodiment.

A timepiece 100 according to the present embodiment is a three-hand analog wristwatch.

The timepiece 100 is formed of a case band 5, a dial 10, a second hand 1, a minute hand 2, an hour hand 3, a crown 50, and other components.

The case band 5 is a case and is made of metal, such as stainless steel or titanium. A movement (not shown) for driving the hands is accommodated behind the dial 10 in the case band 5.

The dial 10 is a circular, timepiece dial having an insertion hole (not shown) provided at the center thereof. Hand shafts are inserted into the insertion hole, and the second hand 1, the minute hand 2, and the hour hand 3 are attached to the hand shafts. The dial 10 has an appearance that imitates the starry sky. In detail, a starry sky is drawn against a dark blue first region 11, which represents a night sky, as a background, with a plurality of small round stars 21, large stars 22 each formed of a star-shaped pentagon, and shallow-blind-hole-shaped circular twinkling stars 31 interspersed.

The dial 10 is further provided, for example, with the brand of the timepiece 100, LOGO 8 representing a logotype, and a scale 23, which is the hour scale. In the present embodiment, the small round stars 21, the large stars 22, LOGO 8, and the scale 23 correspond to a second region, and the twinkling stars 31 correspond to a third region.

The crown 50 is provided so as to allow time correction when pulled one step. The crown 50 may have other functions.

The dial 10, which is produced by using a manufacturing method described later, is a highly decorative dial that reproduces a scene in which large and small stars twinkle in a clear night sky. The dial 10 will be described later in detail.

*Method for Manufacturing Dial*

Figure 2:
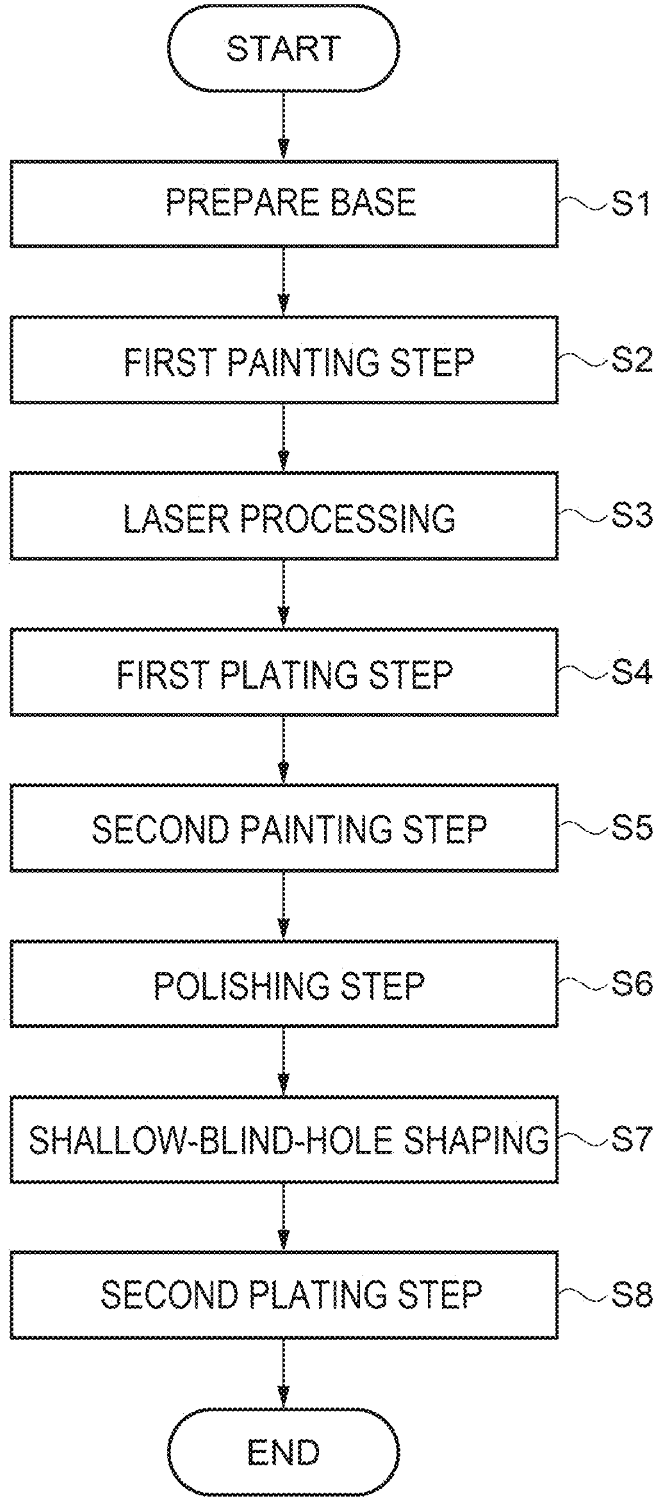
FIG. 2 is a flowchart showing the procedure of a method for manufacturing a dial.
Figure 3:
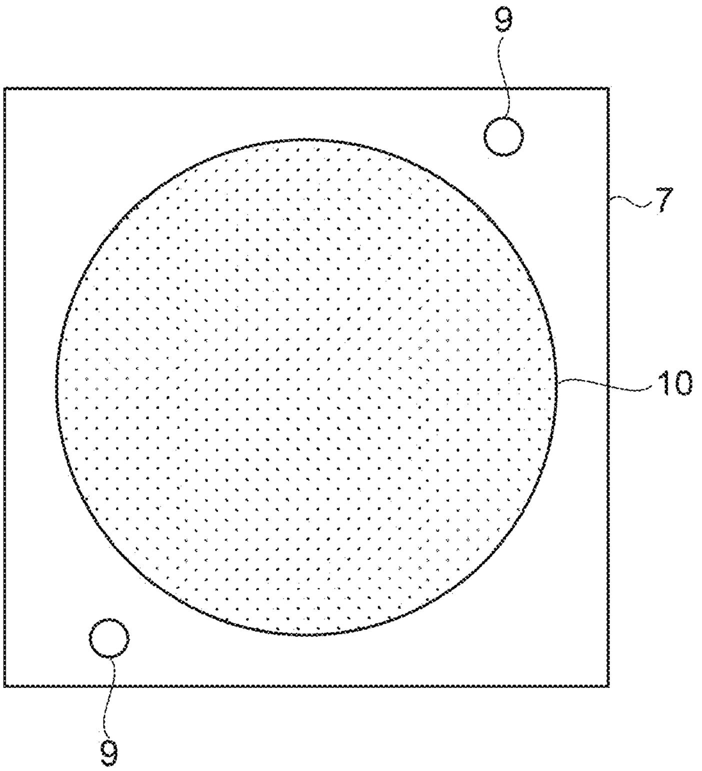
FIG. 3 is a plan view of a base.
Figure 4:
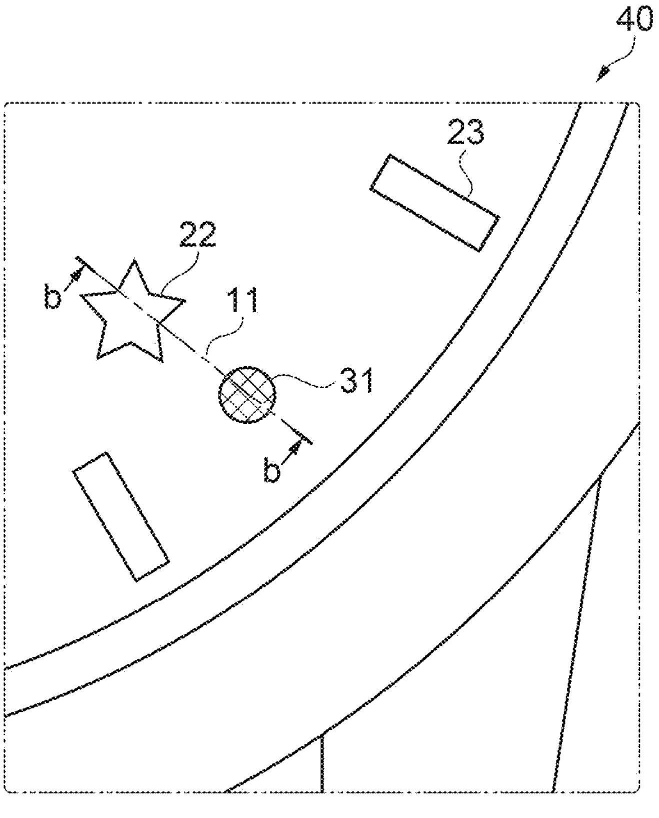
FIG. 4 is an enlarged view of a mark.
Figure 5:
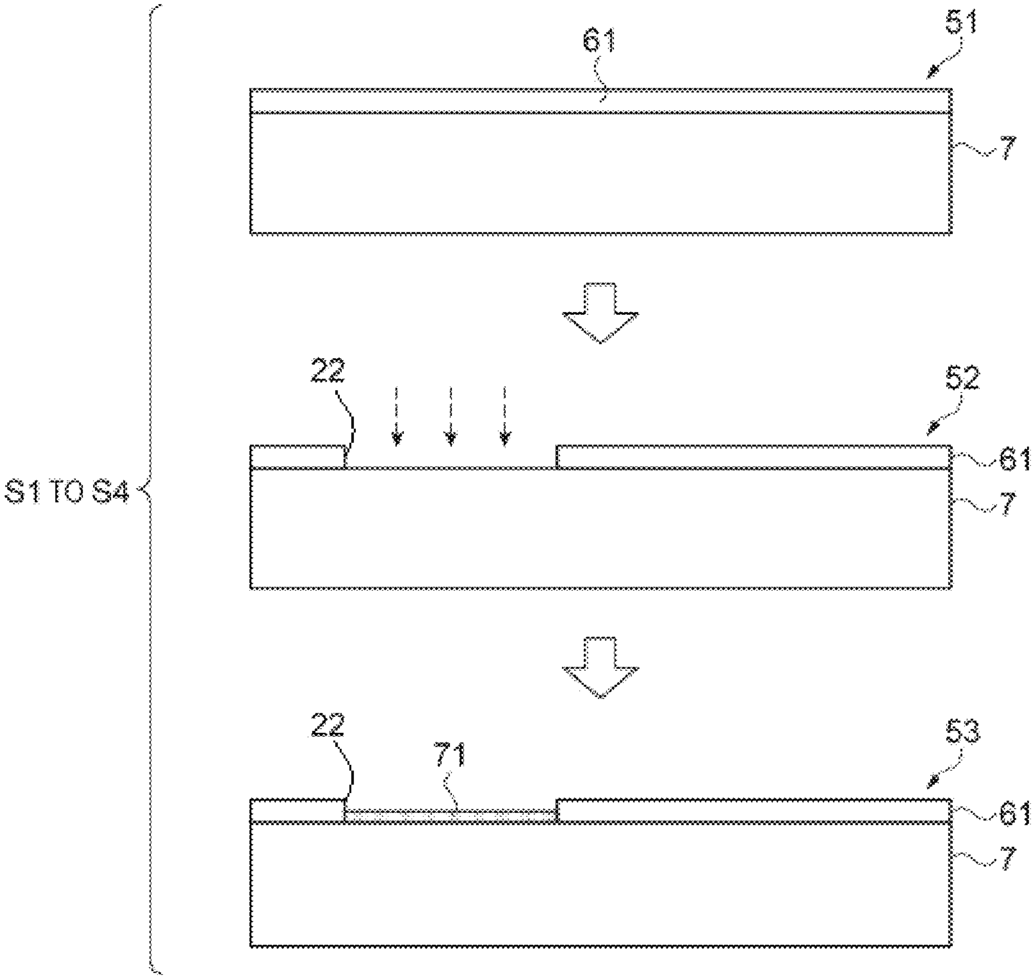
FIG. 5 shows processes of manufacturing the dial.
Figure 6:
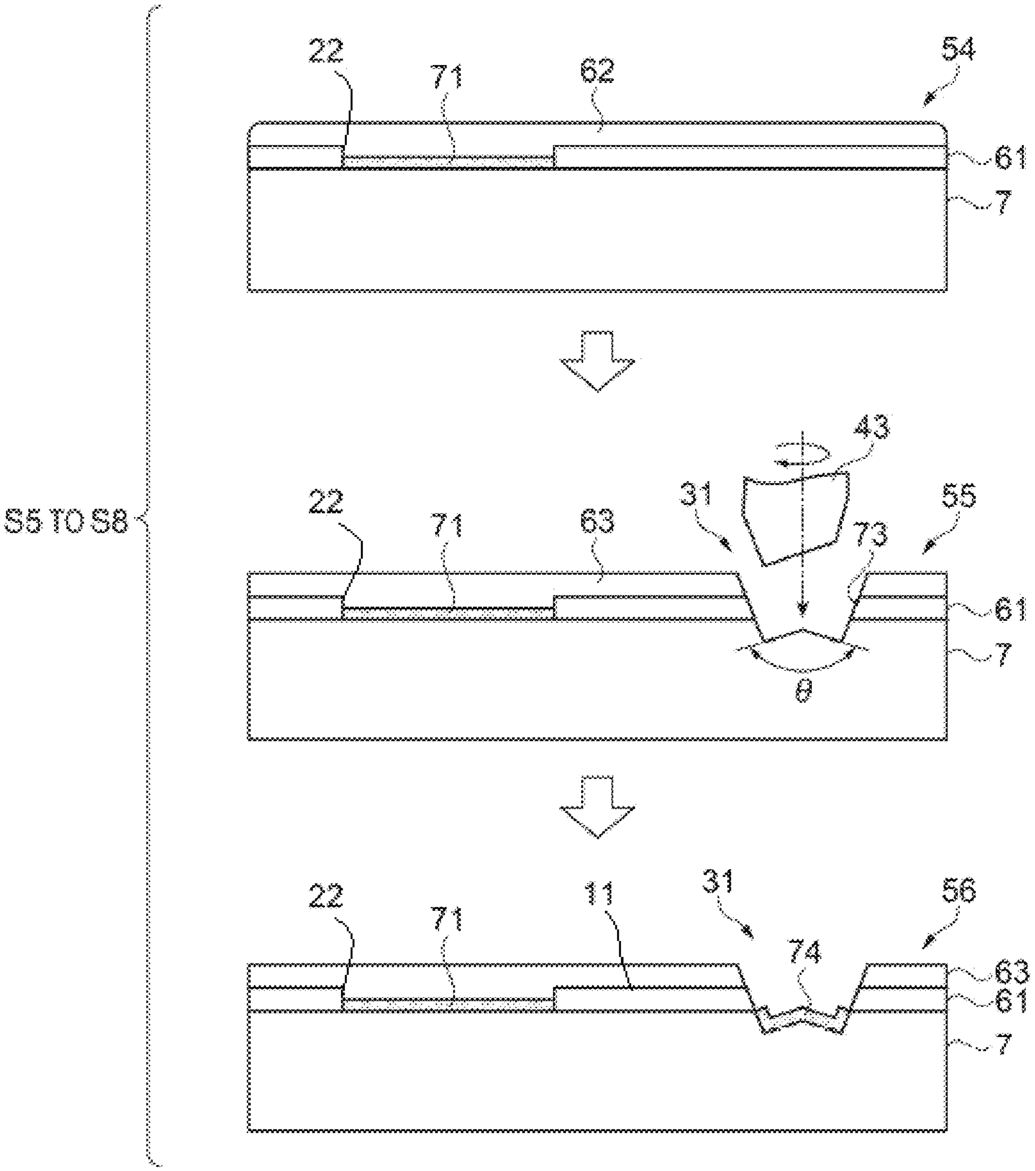
FIG. 6 shows processes of manufacturing the dial.

FIG. 2 is a flowchart showing the procedure of a method for manufacturing the dial. FIG. 3 is a plan view of a base. FIG. 4 is an enlarged view of a first section 40 of the dial 10 in FIG. 1. FIGS. 5 and 6 show manufacturing processes carried out in the cross section taken along the line b-b in the first section 40 in FIG. 4. The method for manufacturing the dial 10 will be described primarily with reference to FIG. 2 along with FIGS. 1 to 6 as appropriate.

In step S1, a base 7 is prepared. The base 7 shown in FIG. 3 is a metal substrate that will form a base of the dial 10. In the initial state, the base 7 has a substantially square shape, and a central portion thereof is an area where the circular dial 10 is formed, as shown in FIG. 3. In a preferable example, the base 7 is a brass plate having a square shape each side of which is about 40 mm in length and having a thickness of about 0.3 mm. The diameter of the dial 10 is about 33 mm. The base 7 is not necessarily made of the material described above and may be made of any metal, for example, nickel silver, a precious metal, such as gold, silver, and platinum, copper, and stainless steel. The base 7 may still instead be made of an alloy of any combination of the materials described above. The thickness and the diameter of the dial 10 are not limited to the values described above.

The base 7 is provided with two reference holes 9 on a diagonal line thereof, as shown in FIG. 3. In manufacturing steps, a set of bases 7 formed of 10 to 20 bases 7 are placed in a jig provided with reference pins corresponding to the reference holes 9, and the positioned bases 7 are processed in each of the steps. In the manufacturing steps, the bases 7 may be moved and processed one by one.

In step S2, the entire surface of each of the bases 7 is painted in a first painting step. In a preferable example, a dark blue acrylic resin is sprayed onto the base 7 to form a coating film 61 made of a nonconductor. The coating film 61, which is a dark blue paint film, is therefore formed across the entire surface of the base 7, as shown in a process diagram 51 in FIG. 5. A portion having the coating film 61, the portion excluding the second region and the third region, will form the first region 11. The color tone of the coating film 61 is not limited to dark blue and may be another color tone in accordance with the appearance of the dial 10. The paint is not limited to acrylic resin and may be any resin material made of a nonconductor, for example, cellulosic resin, polyurethane resin, and acrylic lacquer resin. The method for forming the coating film 61 is not limited to spraying and may, for example, be spin coating, inkjet, dispensing, pad printing (relief printing), or screen printing.

In step S3, a portion of the dial 10, the portion that will form the second region, is processed with laser light. In detail, the portion that will form the second region is irradiated with laser light so that the coating film 61 is removed to expose the base 7. For example, a process diagram 52 in FIG. 5 shows that the base 7 is exposed after a portion of the second region, the portion that will form the large star 22, is irradiated with the laser light so that the coating film 61 is removed. The small round stars 21, LOGO 8, and the scale 23, which form the second region, are also similarly processed with the laser light. In a preferable example, the laser processing uses a laser radiator capable of femtosecond ultrashort pulse radiation. The laser radiation is preferably performed under the conditions that the intensity of the laser light is low but high enough to be capable of removing the coating film 61. The radiation conditions include the output frequency, the scanning speed, the laser power, the scanning path interval, and other parameters. The scanning path interval is not limited to a femtosecond interval and may instead be a picosecond or microsecond interval.

In step S4, the exposed portion of the base 7 is plated in a first plating step. In detail, a first plated layer 71 is formed in the portion where the base 7 is exposed and which will form the large star 22, which forms the second region, as shown in a process diagram 53 in FIG. 5. In a preferable example, the plating is electrolytic plating by which gold is plated to a predetermined thickness. The gold plating maybe performed with a nickel ground layer. The plating is not limited to gold plating and may be any plating that provides a color tone and luster according to the appearance of the dial 10, for example, rhodium, chromium, silver, copper, and tin plating.

In step S5, clear painting in a second painting step is performed on the entire surface of the base 7. In a preferable example, the clear painting is performed on the entire surface of the base 7 by using an acrylic resin along with a paint liquid discharger. The paint is not limited to acrylic paint and may be any resin material made of a nonconductor and having transparency, such as cellulose resin, polyurethane resin, and acrylic lacquer resin. After the painting, the base 7 may be rotated to allow the resultant centrifugal force to diffuse the painting liquid across the entire surface of the base 7. A coating film 62 is thus formed across the entire surface of the base 7, as shown in a process diagram 54 in FIG. 6.

In step S6, a polishing step is performed on the coating film 62 to form a clear protective film 63. In a preferable example, after primary polishing using a lapping machine, secondary polishing using a polishing machine is performed to form the transparent protective film 63 having a polished and planarized surface, as shown in a process diagram 55 in FIG. 6.

In step S7, the portions that form the third region are caused to undergo shallow-blind-hole shaping. In detail, a cutting tool 43 is used to cut the portion that will form the twinkling star 31, which forms the third region, into the base 7 to form a recess 73, as shown in the process diagram 55 of FIG. 6. The thus cut recess 73 penetrates through the protective film 63 and the coating film 61 and extends into the base 7. In a preferable example, the cutting tool 43 is a diamond-tipped punch and is rotated to drill into the portion that will form the twinkle star 31, thereby removing the protective film 63 and the coating film 61 to form the recess 73 extending into the base 7.

The bottom of the recess 73 has a cross-sectional shape with a vertex. In a preferable example, the bottom of the recess 73 has a conical shape that follows the tip of the cutting tool 43, and an apex angle θ of the cone is about 170°. The apex angle θ is not limited to 170°, and the conical shape only needs to have an apex angle greater than or equal to 90° but smaller than 180°.

The recess 73 is formed by using the diamond cutting tool 43 having a sharp tip and therefore has a smoothly finished surface. In detail, the surface roughness of the recess 73 is smaller than the surface roughness of the ground layer of the second region formed by the laser processing. In other words, the surface roughness of the third region is smaller than the surface roughness of the second region. The optical reflectance of the third region is therefore greater than that of the second region, so that the third region is observed to be more shining.

In step S8, a portion of the recess 73, the portion where the base 7 is exposed, is plated in a second plating step. In a preferable example, the plating processing is performed by electrolytic plating, and rhodium is plated to a predetermined thickness to form a second plated layer 74 at the conical shape of the bottom of the recess 73 and therearound, as shown in a process diagram 56 in FIG. 6. The twinkling stars 31, which form the third region, are thus completed.

In the process diagram 56 in FIG. 6, the first region is provided between the large star 22, which forms the second region, and the twinkling star 31, which forms the third region. The twinkling star 31, which forms the third region, is surrounded by the first region 11. In other words, the large star 22 having a surface formed of the first plated layer 71 and the twinkling star 31 having a surface formed of the second plated layer 74 are disposed in the dark blue portion representing the night sky, with the large gold star 22 observed through the transparent protective film 63 and the silver twinkling star 31 observed bare. The plating in the second plating step is not limited to rhodium plating and may be any plating that provides a color tone and luster according to the appearance of the dial 10, for example, gold, chromium, silver, copper, and tin plating.

The description will refer to FIG. 1 again.

The large star 22 and the twinkling star 31 in the first section 40 of the dial 10 have been described as representatives, and the other large stars 22 and twinkling stars 31 are formed in parallel in the same manner. The other elements, which form the second region, that is, the small round stars 21, LOGO 8, and the scale 23, are also formed in parallel in the same manner.

Figure 7:
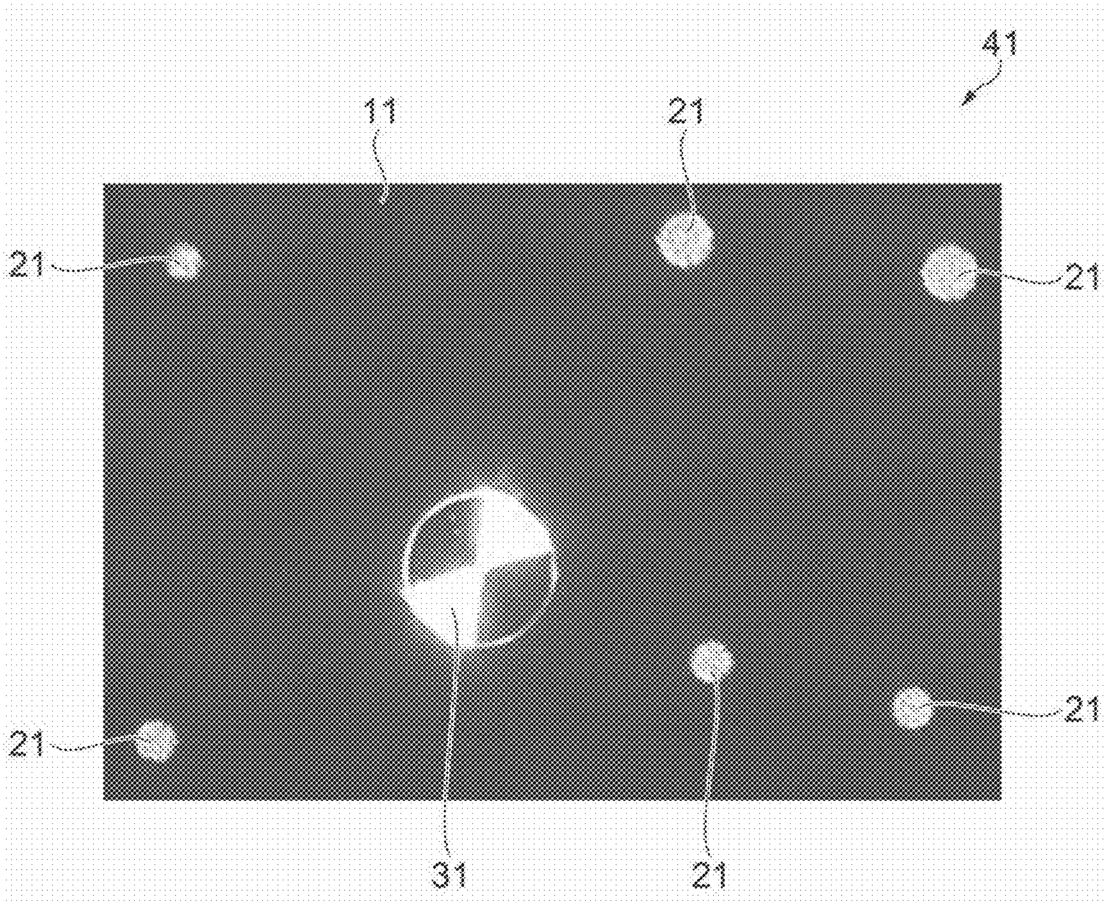
FIG. 7 is an enlarged photograph of a scale.

FIG. 7 is an enlarged photograph of a second section 41 of the dial 10 in FIG. 1.

One twinkling star 31 and six small round stars 21 are disposed in the second section 41, as shown in FIG. 7. In other words, one twinkling star 31 and the six small round stars 21 that surround the twinkling star 31 are disposed against the dark blue background that forms the first region 11.

In the dark blue portion representing the night sky, which forms the first region 11, six small round stars 21 and the twinkling star 31, which are all gold plated, are observed shining. The twinkling stars 31, the surfaces of which are smoother than the surfaces of the small round stars 21 and which are plated with bare rhodium, are more shining than the small round stars 21. Furthermore, the conical surface of the bottom of each of the twinkling stars 31 causes a variety types of optical reflection, so that the light from the twinkling stars 31 flickers depending on the angle of observation, and the twinkling stars 31 are observed more shining. Moreover, rhodium is chemically stable and is unlikely to corrode or discolor and therefore changes little over time even when exposed to air.

As described above, the dial 10 and the timepiece 100 according to the present embodiment can provide the following effects.

The dial 10 includes the base 7, the first region 11, which has the coating film 61 provided at the surface of the base 7, the large stars 2 as the second region where the laser light is radiated to the first region 11 to remove the coating film 61, and the twinkling stars 31 as the third region where part of the first region 11 is cut into the base 7, and the surface roughness of the twinkling stars 31 is smaller than the surface roughness of the large stars 22.

According to the configuration described above, the first region 11 has the coating film 61 on the base 7, the second region is provided with a variety of patterns, for example, the large stars 22, produced by removal of the coating film 61, and the twinkling stars 31, which form the third region, are produced by cutting the films on the base 7 into the base 7 and have surfaces finished more smoothly than the surface of the second region. The dial 10 therefore has three regions having differently finished surfaces.

The dial 10 having excellent decorative and appearance qualities can therefore be provided. Furthermore, the positions, number, size, shape, and other factors of the regions can be quantitatively controlled via processing settings, whereby the dial 10 having a stable quality can be provided.

The optical reflectance of the surfaces of the twinkling stars 31, which form the third region, is greater than the optical reflectance of the surfaces of the large stars 22, which form the second region. In detail, the surface roughness of the recesses 73 is smaller than the surface roughness of the ground layer of the second region formed by the laser processing. In other words, the surface roughness of the third region is smaller than the surface roughness of the second region. The visible light reflectance of the twinkling stars 31 is therefore greater than that of the surfaces of the first plated layers 71 of the large stars 22, so that the twinkling stars 31 are observed to be more shining than the large stars 22. Therefore, since the optical reflectance varies from region to region, a variety of visual effects can be provided, whereby the decorativeness of the dial 10 can be further enhanced.

The twinkling stars 31, which form the third region, are surrounded by the first region 11 having the dark blue background representing the night sky.

According to the configuration described above, the twinkling stars 31, which are portions cut into the base 7 and smoothly finished, each have the coating film 61 and are disposed in the first region 11 having a rich color tone imitating the night sky, so that the regions that differ from each other in optical reflectance are adjacent to each other, whereby the resultant visual contrast allows the twinkling stars 31 to be highlighted.

The first region 11 is provided between the large stars 22, which form the second region, and the twinkling stars 31, which form the third region. In detail, part of the first region 11 is located between the large stars 22 and the twinkling stars 31, as shown in the process diagram 56 in FIG. 6.

According to the configuration described above, in which three regions having differently finished surfaces are adjacent to each other, the dial 10 having a visual contrast and providing a variety of visual effects can be provided.

The large stars 22, which form the second region, and/or the twinkling stars 31, which form the third region, each include a plated layer. The preferable example has been described with reference to the case where both the large stars 22 and the twinkling stars 31 each have a plated layer, but not necessarily, and the large stars 22 and/or the twinkling stars 31 only need to include a plated layer in accordance with the appearance of the dial 10.

According to the configuration described above, in which at least one of the second and third regions shows a color or texture different from that of the base 7, a variety of visual effects can be provided, and the decorativeness of the dial 10 can be further enhanced. In particular, plating a region where part of the coating film 61 is removed by laser processing or machining allows the patterns that form the second and third regions having plated metal texture to be disposed in any positions, sizes, shapes, and numbers against a nonmetallic texture background.

The coating film 61 in the first region 11 is a nonconductor. In a preferable example, a paint film made of dark blue acrylic resin is used as the coating film 61.

According to the configuration described above, when electroplating is performed on at least one of the second and third regions, the first region 11 is not plated, whereby the surface finishing can be reliably differentiated.

The twinkling stars 31, which form the third region, each have a cross-sectional shape with a vertex. In detail, the bottom of the recess 73 of each of the twinkling stars 31 has a conical shape with a vertex.

Light is reflected off the twinkling stars 31 differently in accordance with the angle at which the twinkling stars 31 are viewed, whereby a more diverse visual effects can be provided. The twinkling stars 31 do not each necessarily have the cross-sectional shape described above and may each have a bottom surface formed of only one inclining surface.

The timepiece 100 includes the dial 10 described above.

The timepiece 100 having excellent decorative and appearance qualities can therefore be provided.

In the present embodiment, the small round stars 21, the large stars 22, LOGO 8, and the scale 23 correspond to the second region, but not necessarily. For example, the small round stars 21 and the large stars 22 may be formed as the second region, and LOGO 8 and the scale 23 may be formed as another region.

In the present embodiment, the painting in the first painting step is performed on the entire surface of the base 7 in step S2, but not necessarily. For example, the base 7 may be plated before the entire surface of the base 7 is painted in the first painting step.

According to the configuration described above, the laser processing is performed on the portion that will form the second region of the dial 10 in step S3 to form a portion where the coating film 61 is removed to expose the plated portion and a portion where the coating film 61 and the plated portion are removed to expose the base 7, whereby the number of a variety of expressions can be increased, and the appearance can be improved.

Second Embodiment *Different Aspects of Dial*

Figure 8:
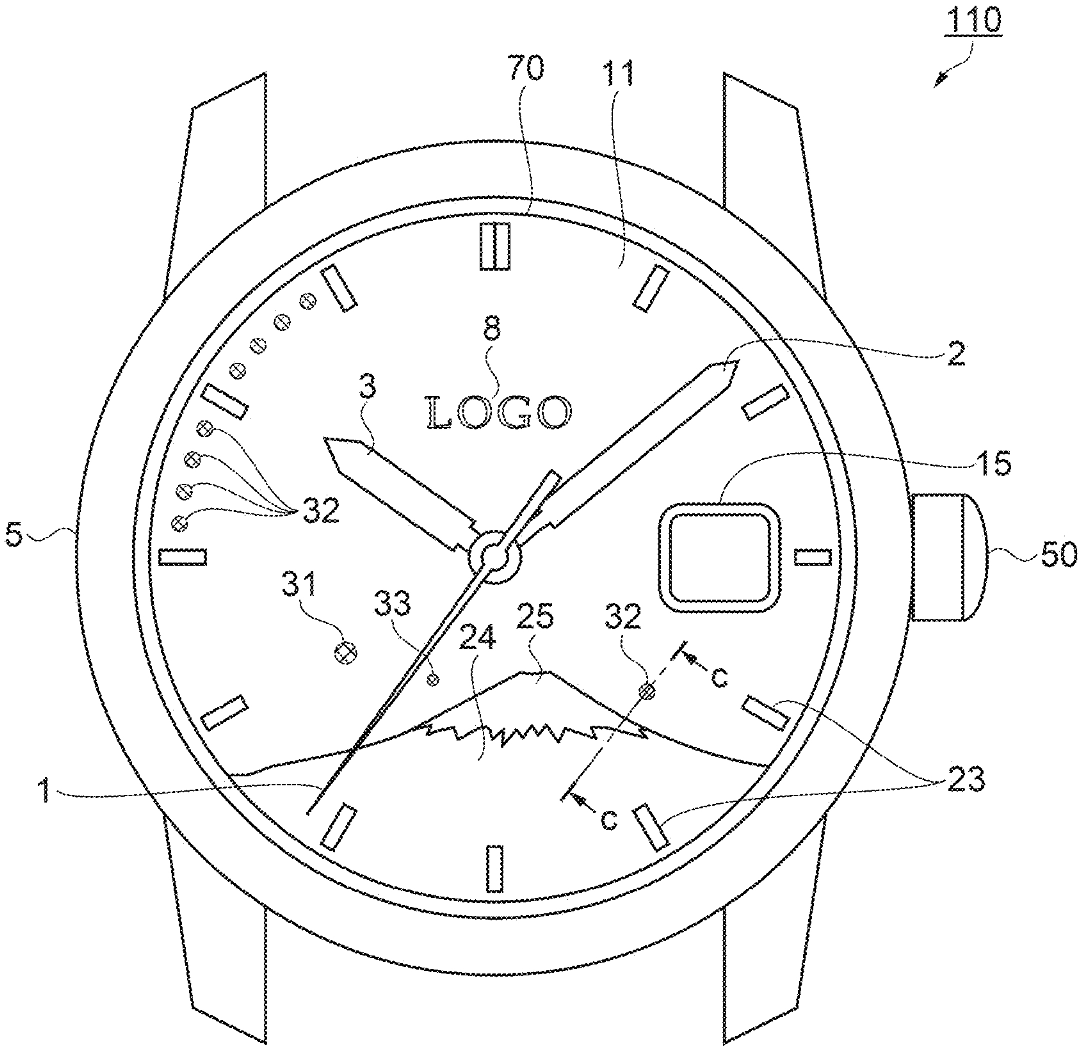
FIG. 8 is a plan view of a timepiece according to a second embodiment.
Figure 9:
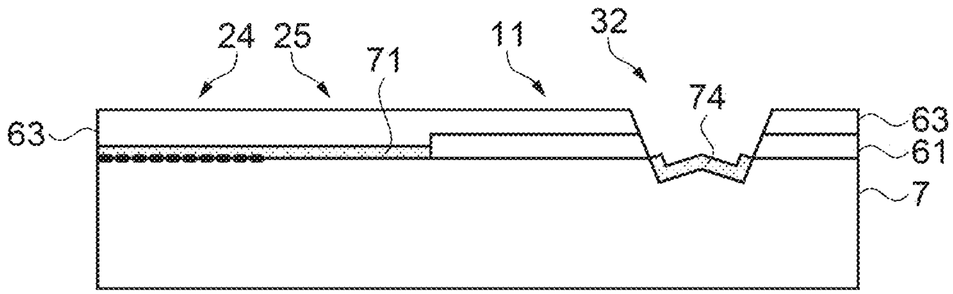
FIG. 9 is a cross-sectional view of the dial.

FIG. 8 is a plan view of the timepiece according to the present embodiment and corresponds to FIG. 1. FIG. 9 is a cross-sectional view taken along the line c-c in FIG. 8 and corresponds to the process diagram 56 in FIG. 6.

The following description will be made of a dial 70 according to the present embodiment with reference primarily to FIG. 8 along with FIG. 9 and other figures as appropriate. The dial 70 according to the present embodiment has an appearance different from that of the dial 10 according to the first embodiment but is manufactured by using substantially the same method for manufacturing the dial 10 and has three regions different in texture from one another as the dial 10 does. In the following description, the same configuration portions as those in the first embodiment have the same reference characters and will not be redundantly described.

The dial 70 of a timepiece 110 according to the present embodiment has the first region 11 as a night-sky background, the second region having a mountain pattern imitating Mt. Fuji on the side facing 6 o'clock, and the third region formed of twinkling stars 31, 32, and 33 twinkling in the night sky above Mt. Fuji, as shown in FIG. 8. The first region 11 is a dark blue background region, as in the dial 10. The mountain pattern in the second region is formed of a mountain surface section 24 representing a foot portion of the mountain and a snow surface section 25 representing a snowcapped portion of the mountain peak. The mountain surface section 24 and the snowcapped surface section 25 are both formed in the laser radiation step, which is step S3 of FIG. 2, but have differently finished surfaces. In detail, in the snow surface section 25, the laser radiation removes the coating film 61 to simply expose the base 7, while in the mountain surface section 24, the laser radiation exposes the base 7 and then roughens the surface of the base 7. In detail, the laser radiation performed on the portion that will form the mountain surface section 24 is performed under a stronger radiation condition than the radiation condition under which the laser radiation is performed on the portion that will form the snow surface section 25. Furthermore, undulation and other characteristics of the mountain surface can be patterned with lines.

FIG. 9 diagrammatically shows the state described above, in which a surface of the base 7, the surface in the portion that will form the mountain surface section 24, is more roughly finished than a surface of the base 7, the surface in the portion that will form the snow surface section 25. The dial 70 is configured in the same manner in which the dial 10 is configured except for the differentiation made by the laser radiation conditions, that is, the first plated layer 71 is formed by electrolytic plating at the laser-processed portion of the base 7, and the transparent protective film 63 is provided on the first plated layer 71. The difference in the surface roughness of the base 7 is reflected in the first plated layer 71. Therefore, when observed through the protective film 63, the difference between the unevenly looking mountain surface section 24 and the smooth snow surface section 25 is visually perceived as a difference in texture. Furthermore, not only the mountain pattern but LOGO 8 and the scale 23 form the second area, as in the dial 10. The dial 70 is additionally provided with a date window 15 as the second region. The date window 15 is a frame-shaped date window provided on the side facing 3 o'clock and has the same configuration as those of LOGO 8 and other components.

The description will refer to FIG. 8 again.

The dial 70 is provided, as the third region, with the three twinkling stars 31, 32, and 33 having different sizes. The largest twinkling star 31 has the same size as that of the twinkling stars on the dial 10. The twinkling star 32 is one size smaller than the twinkling star 31. The twinkling star 33 is one size smaller than the twinkling star 32 and is therefore the smallest twinkling star. The twinkling stars having different diameters can be separately produced by adjustment of the diameter of the cutting tool 43 in the shallow-blind-hole-shaping step, which is step S7 in FIG. 2. Increasing the diameter of the cutting tool 43 increases the size of a twinkling star, while decreasing the diameter of the cutting tool 43 decreases the size of the twinkling star. Regardless of the diameter, the cross-sectional configuration of the twinkling stars is the same as that of the twinkling star 32 in FIG. 9.

As described above, the dial 70 according to the present embodiment can provide the following effects in addition to the effects provided by the embodiment described above.

The dial 70 has the first region 11 as a night-sky background, the second region formed of the mountain surface section 24 and the snow surface section 25 imitating Mt. Fuji on the side facing 6 o'clock, and the third region formed of the twinkling stars 31, 32, and 33 above Mt. Fuji. In particular, the difference in texture between the unevenly looking mountain surface section 24 and the smooth snow surface section 25 is made by different types of laser processing.

The timepiece dial 70 having excellent decorative and appearance qualities can therefore be provided. Furthermore, the positions, numbers, sizes, shapes, and other factors of the regions can be quantitatively controlled via processing settings, whereby the dial 70 having a stable quality can be provided.

*Variation*

Figure 10:
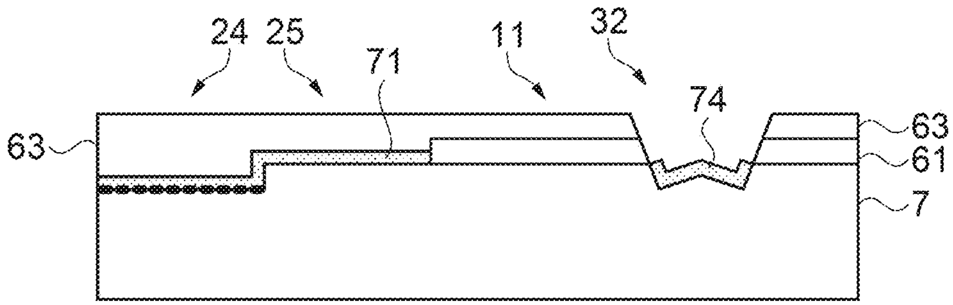
FIG. 10 is a cross-sectional view of a variation of the dial.

FIG. 10 is a cross-sectional view of a variation taken along the line c-c in FIG. 8 and corresponds to FIG. 9.

The differentiation of the second region made by the laser processing in step S3 in FIG. 2 is not limited to a difference in the surface finishing of the base 7 and is also applicable to the processing of the base 7.

The height of the base 7 in the mountain surface section 24 is one step smaller than the height of the base 7 in the snow surface section 25, as shown in FIG. 10. The structure described above is achieved by changing the laser radiation conditions under which the laser light is radiated to the mountain surface section 24 in such a way that the intensity of the laser light is increased so as to be capable of cutting the base 7 and cut the base 7 thereinto. In detail, in the mountain surface section 24, the laser radiation conditions are so changed that the intensity of the laser light is raised so that the base 7 is cut thereinto to a predetermined depth and then so changed that the intensity of the laser light is lowered so that the resultant cut surface is finished to have the roughness of the mountain surface. The dial 70 is configured in the same manner in which the dial 10 is configured except for the differentiation made by the laser radiation conditions, that is, the first plated layer 71 is formed by electrolytic plating at the laser-processed portion of the base 7, and the transparent protective film 63 is provided on the first plated layer 71. According to the configuration described above, the difference in texture between the unevenly looking mountain surface section 24 and the smooth snow surface section 25 is combined with a three-dimensional effect due to the difference in height between the two sections, whereby the dial 70 having more excellent decorative and appearance qualities can be provided. The base 7 with a step formed in advance may be used. In this case, the same processing as that described above may be performed on the base 7 having a surface processed in advance, for example, by using cutting, stamping, laser processing, or engraving.

The description will refer to FIG. 8 again.

Twinkling stars having different sizes can be separately produced by adjustment of the diameter of the cutting tool 43 in the shallow-blind-hole-shaping step, which is step S7 in FIG. 2, as described above.

The twinkling stars, which form the third region, are not limited to stars in the night sky and can be used in a portion responsible for the function of the timepiece 100. For example, between 9 o'clock and 11 o'clock on the dial 70 in FIG. 8, the twinkle stars 32, which form the third region, are disposed as typesetting indicating the minute/second, but not necessarily. For example, large twinkling stars may be used in place of the scale 23, or letters each formed of a series of small twinkling stars may be used in place of LOGO 8.

The timepiece dial 70 having more excellent decorative and appearance qualities can therefore be provided.

What is claimed is:

1. A timepiece dial comprising a base having a first region having a coating film provided at a surface of the base, a second region where laser light is radiated to the first region to remove the coating film, and a third region, in part of the first region, where the coating film is absent and the base has a recess including a cross-sectional shape having a pair of downwardly extending sidewalls that terminate at a bottom of the recess, and the bottom of the recess includes a pair of upwardly extending surfaces that meet to define an upwardly extending apex at a center of the bottom of the recess, wherein surface roughness of the third region is smaller than surface roughness of the second region.

2. The timepiece dial according to claim 1, wherein optical reflectance of a surface of the third region is greater than optical reflectance of a surface of the second region.

3. The timepiece dial according to claim 1, wherein the third region is surrounded by the first region.

4. The timepiece dial according to claim 1, wherein the first region is provided between the second region and the third region.

5. The timepiece dial according to claim 1, wherein at least one of the second region and the third region includes a plated layer.

6. The timepiece dial according to claim 1, wherein the coating film in the first region is a nonconductor.

7. A timepiece comprising the timepiece dial according to claim 1.

* * * * *